(12) United States Patent
Liu et al.

(10) Patent No.: US 7,673,166 B2
(45) Date of Patent: Mar. 2, 2010

(54) COMPUTATION OF PROCESSOR CLOCK FREQUENCY RATIOS

(75) Inventors: Jonathan Yu Han Liu, Philadelphia, PA (US); James Mankovich, Boulder, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 655 days.

(21) Appl. No.: 11/586,284

(22) Filed: Oct. 24, 2006

(65) Prior Publication Data

US 2008/0098252 A1    Apr. 24, 2008

(51) Int. Cl.
    *G06F 1/04* (2006.01)
(52) U.S. Cl. ................... 713/503; 713/502; 713/600
(58) Field of Classification Search ........... 713/502, 713/503, 600
    See application file for complete search history.

(56) References Cited

U.S. PATENT DOCUMENTS

| | | |
|---|---|---|
| 5,050,070 A | 9/1991 | Chastain et al. |
| 5,159,686 A | 10/1992 | Chastain et al. |
| 5,459,855 A | 10/1995 | Lelm |
| 2001/0027503 A1* | 10/2001 | Yamato et al. ............ 710/126 |
| 2003/0177163 A1* | 9/2003 | Nomura ..................... 709/102 |
| 2006/0161799 A1* | 7/2006 | Degenhardt ............... 713/600 |

OTHER PUBLICATIONS

Mills, David L., Network Working Group, Request for Comments 1305, "Network Time Protocol (Version 3), Specification, Implementation and Analysis," Mar. 1992 (pp. 1 of 97).

* cited by examiner

*Primary Examiner*—Thuan N Du

(57) ABSTRACT

An embodiment of the invention provides an apparatus for computation of processor clock frequency ratios in a multi-processor system. The apparatus includes a computation engine configured to determine a processor clock frequency ratio by reading counter values of a first counter and of a second counter within a frequency ratio computation interval, and configured to determine a value of the second counter at an end of a frequency ratio valid interval where the frequency ratio is applied, wherein the frequency ratio valid interval is subsequent to the frequency ratio computation interval, and wherein the frequency ratio valid interval does not overlap the frequency ratio computation interval.

24 Claims, 7 Drawing Sheets

COMPUTATION OF PROCESSOR CLOCK FREQUENCY RATIOS

TECHNICAL FIELD

Embodiments of the invention relate generally to computation of processor clock frequency ratios on multi-processor systems without a common frequency clock source.

BACKGROUND

The speed at which a processor performs basic operations is known as the "clock rate". These basic processor operations include, for example, adding two numbers or transferring a value from one register to another register. The clock rate is usually given in Mega-Hertz (millions of cycles per seconds). The clock rate of a processor is normally determined by the frequency of vibration of a quartz crystal that sends pulses (clock signals) to the processor.

In a processor, counters are used to count the sequence of operations that are performed by the processor in accordance with programmed instructions and to call forth the next operation from memory when the preceding instruction has been completed. When processors are accessing (e.g., reading) a shared memory in a multi-processor system, there is a delay between the read request from memory and the actual return of the data to the processor from shared memory. These delays are caused by an uncontrollable event such as, for example, another processor in the system attempting to read the same value in the shared memory or due to the instructions that need to be executed by the processor between the request occurrence and the actual read occurrence.

Multi-processor systems typically compute a processor clock frequency ratio that relates one processor's counter increment rate to another processor's counter increment rate. In a computer system where there is no common frequency clock source, the frequency ratio is calculated based on the difference in magnitude between two counters on different processors over a known interval. Therefore, the calculated frequency ratio can be used to translate one processor's counter value to the other processor's counter value. This translation of independent processor counter values to a common frequency can be used to implement a software based globally accessible common frequency counter within a multi-processor system. However, current methods do not use this frequency ratio to accurately compute a value of a counter in a processor when latencies occur in a multi-processor system.

Therefore, the current technology is limited in its capabilities and suffers from at least the above constraints and deficiencies.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments of the invention.

Figure 1:
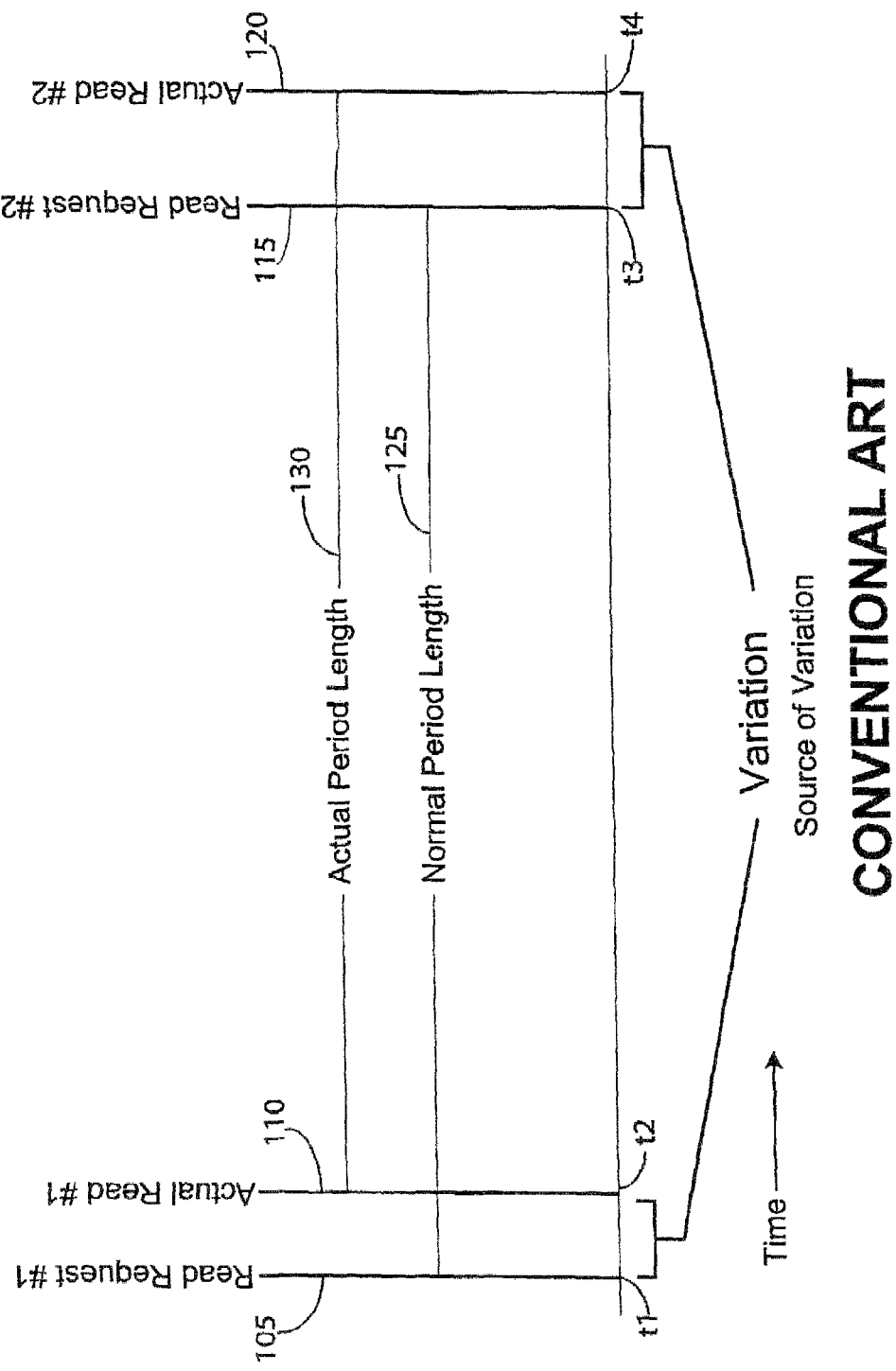
FIG. 1 is a graph illustrating the latencies encountered by a processor when accessing a memory.
Figure 2:
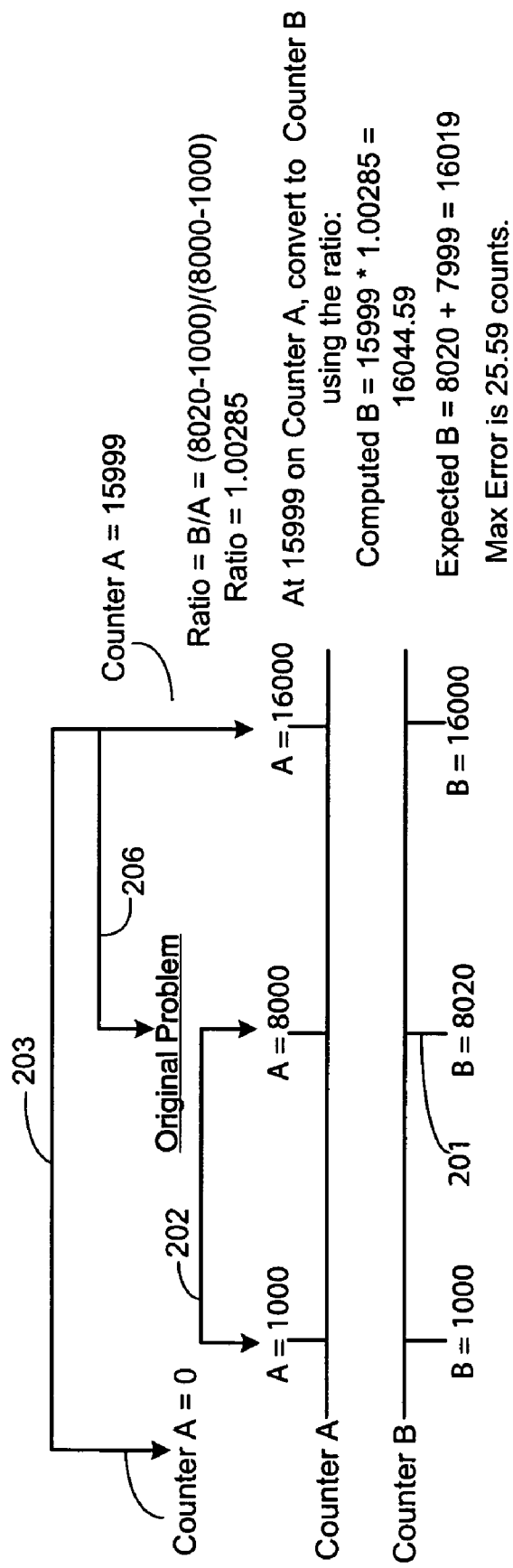
FIG. 2 is a graph illustrating the inaccurate computation of counter values in prior methods when frequency ratio is used in the computation.
Figure 3:
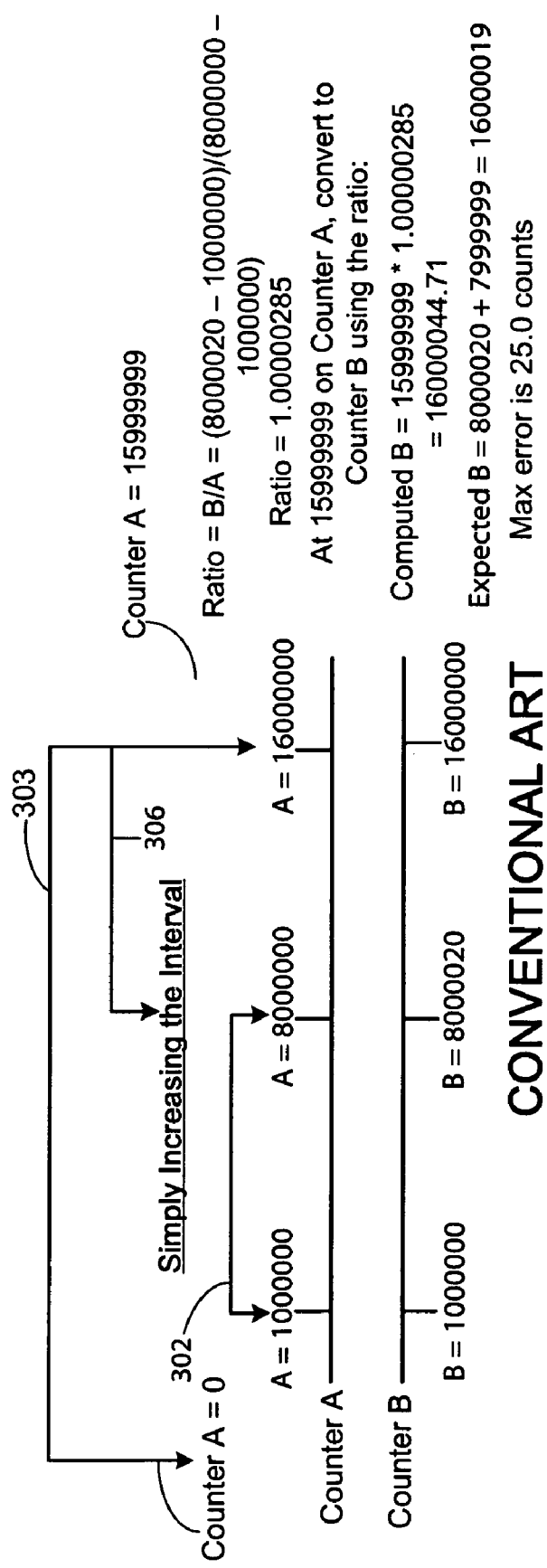
FIG. 3 is a graph illustrating the inaccurate computation of counter values in another prior method when frequency ratio is used in the computation.

For purposes of describing the problems solved by embodiments of the invention FIGS. 1 to 3 are initially discussed. FIG. 1 is a graph illustrating the latencies encountered by a processor when accessing a memory. A first read request 105 from a processor to a shared memory may occur at time t1, while the actual read 110 of the shared memory occurs at subsequent time t2 because the reads are not instantaneously performed as previously discussed above. A second read request 115 to the shared memory may occur at subsequent time t3, while the actual read 120 of the shared memory occurs at subsequent time t4. The time period 125 is the time occurrence between the first read request 105 and the second read request 115. The time period 130 is the time occurrence between the actual read 110 at time t2 and the actual read at time t4. Therefore, there is latency between the read request at t1 and the actual read of the memory at t2, and between the second read request at t3 and the actual read of the memory at t4. The nominal period length 125 (time occurrence between the read requests) is the desired time value to be measured. However, due to the read latencies, the actual period length 130 (time occurrence between the actual reads of the memory) is the time value that is actually measured. With such variation in read latencies, it is difficult to know the actual time amount taken to read the value from memory and the actual period length 130. These latencies have an effect on the counter values of processors.

FIG. 2 is a graph illustrating the inaccurate computation of counter values in prior methods when frequency ratio is used in the computation. Counter A is used to count the sequence of operations that are performed by a first processor, and Counter B is used to count the sequence of operations that are performed by a second processor. Assume that the Counters A and B will increment at the same rate for each operation performed. In the example of FIG. 2, assume that the Counter B has a variation of 20 counts at time value 201 because the second processor associated with Counter B does not encounter latencies when performing operations and the first processor associated with Counter A encounters latencies. Therefore, Counter B will have a higher count value than Counter A at time value 201 because the second processor is able to perform more operations than the first processor. Note that since the read latencies to a shared memory are not constant due to uncontrollable events as described above, it is possible in other examples for Counter A to also have variations and for Counter A and/or Counter B to also have variations after the time value 201.

The time interval 202 is used to compute the processor clock frequency ratio (i.e., "Ratio"). In prior methods, the time interval 202 can be set to various suitable values (e.g., approximately 500 milliseconds) or is increased in time value (e.g., greater than approximately 500 milliseconds) as discussed below with reference to FIG. 3.

The frequency ratio of Counter A to Counter B is equal to Ratio=1.00285 and is determined for the time interval 202 by use of equation (1):

$$\text{Ratio} = (C1.\text{end} - C1.\text{start})/(C2.\text{end} - C2.\text{start}) \quad (1)$$
$$= (8020 - 1000)/(8000 - 1000)$$
$$\text{Ratio} = 1.00285$$

The parameter, C1.start, is the counter B value at the beginning of time interval 202. In the example of FIG. 2, counter B has a value of 1000 at C1.start. The parameter, C1.end, is the counter B value at the end of time interval 202. In the example of FIG. 2, counter B has a value of 8020 at C1.end. The parameter, C2.start, is the counter A value at the beginning of time interval 202. In the example of FIG. 2, counter A has a value of 1000 at C2.start. The parameter, C2.end, is the counter A value at the end of time interval 202. In the example of FIG. 2, counter A has a value of 8000 at C2.end. The values of the counters A and B at the beginning and end of the time interval 202 are determined by measurement of the counter values.

The frequency ratio, Ratio=1.00285, would be applied at the end of the time interval 203, where Counter A has a value of 0 at the beginning of time interval 203 and Counter A has a value of 15999 at the end of time interval 203. When the Counter A has a value of 16000, a new frequency ratio is computed in the time interval defined from Counter A value of 8000 to Counter A value of 16000, and the new frequency ratio will be applied at the end of a new time interval defined from Counter A value 0 to Counter A value 23999.

The frequency ratio is multiplied to value of Counter A at the end of time interval 203, in order to compute the value of Counter B at end of time interval 203 (i.e., "Computed B"), as shown in equation (2). At the end of time interval 203, Counter A has a value of 15999.

$$\text{Computed } B = (\text{Counter } A \text{ value at end of time} \quad (2)$$
$$\text{interval where frequency ratio is}$$
$$\text{applied}) \times (\text{frequency ratio})$$
$$= 15999 \times 1.00285$$
$$\text{Computed } B = 16044.59$$

The expected value for counter B at then end of the time interval 203 where the frequency ratio is applied (i.e., "Expected B"), is determined by equation (3). The last known value of counter B of 8020 was previously measured at the end of time interval 202. The number of counts that have elapsed on Counter A (from the last known Counter A value of 8000 to the end of the time interval 203 where the frequency ratio is applied) is defined by the time interval 206. The time interval 206 in the example of FIG. 2 has 7999 counts because Counter A has a value of 15999 at the end of the time interval 206 and a value of 8000 at the beginning of interval 206.

$$\text{Expected } B = (\text{last known value of counter } B) + \quad (3)$$
$$(\text{the number of counts that have}$$
$$\text{elapsed on Counter } A \text{ from the last}$$
$$\text{known Counter } A \text{ value to the end of}$$
$$\text{the time interval where the frequency}$$
$$\text{ratio is applied}).$$
$$= 8020 + 7999$$
$$\text{Expected } B = 16019$$

The measured error (i.e., "Max Error") between the computed value of Counter B at the end of time interval 203 where the frequency ratio is used (Computed B) and the expected value for counter B at then end of the time interval 203 where the frequency ratio used is Max Error=25.59 counts, as shown in equation (4).

$$\text{Max Error} = (\text{Computed } B) - (\text{Expected } B) \quad (4)$$
$$= 16044.59 - 16019$$
$$\text{Max Error} = 25.59 \text{ counts}$$

Therefore, prior methods do not accurately compute the Computed B value by use of the frequency ratio when latencies occur in a multi-processor system. As mentioned above, accurate computation of counter values when latencies occur is useful for time synchronization within a multi-processor system.

FIG. 3 is a graph illustrating the inaccurate computation of counter values in another prior method when frequency ratio is used in the computation. A commonly-used approach to attempt to reduce the Max Error value is by increasing the time interval 202 (shown as increased time interval 302) over which the frequency ratio is computed. This increased time interval 302 may lead to a more accurate frequency ratio value. However, as shown in FIG. 3, there is seen a similar large amount of Max Error value of 25.0 counts between the Computed B value and the Expected B value.

Specifically, in FIG. 3, the interval 302 is used to compute the frequency ratio (i.e., "Ratio"). The frequency ratio of Counter A to Counter B is equal to Ratio=1.0000028 as calculated by equation (5):

$$\text{Ratio} = (C1.\text{end} - C1.\text{start})/(C2.\text{end} - C2.\text{start}) \quad (5)$$
$$= (8000020 - 1000000)/(8000000 - 10000000)$$
$$\text{Ratio} = 1.00000285$$

The frequency ratio, Ratio=1.00000285, would be multiplied to the counter A value of 15999999 at the end of the time interval 303, in order to calculate the Computed B value as shown in equation (6).

$$\begin{aligned}
\text{Computed } B &= (\text{Counter } A \text{ value at end of time} \\
&\quad \text{interval where frequency ratio is} \\
&\quad \text{applied}) \times (\text{frequency ratio}) \\
&= 15999999 \times 1.0000028
\end{aligned} \quad (6)$$

$$\text{Computed } B = 16000044$$

The last known value of counter B of 8000020 was previously measured at the end of time interval 302. The number of counts that have elapsed on Counter A (from the last known Counter A value of 8000000 to the end of the time interval 303 where the frequency ratio is applied) is defined by the time interval 306. The time interval 306 in the example of FIG. 3 has 7999999 counts because Counter A has a value of 15999999 at the end of the time interval 306 and a value of 8000000 at the beginning of the time interval 306. Expected B is calculated by use of equation (7):

$$\begin{aligned}
\text{Expected } B &= (\text{last known value of counter } B) + \\
&\quad (\text{the number of counts that have} \\
&\quad \text{elapsed on Counter } A \text{ from the last} \\
&\quad \text{known Counter } A \text{ value to the end of} \\
&\quad \text{the time interval where the frequency} \\
&\quad \text{ratio is applied}) \\
&= 8000020 + 7999999
\end{aligned} \quad (7)$$

$$\text{Expected } B = 16000019$$

The measured error (i.e., "Max Error") between the computed value of Counter B at the end of time interval 303 where the frequency ratio is used (Computed B) and the expected value for counter B at then end of the time interval 303 where the frequency ratio is used is Max Error=25.0 counts, as shown in equation (8).

$$\begin{aligned}
\text{Max Error} &= (\text{Computed } B) - (\text{Expected } B) \\
&= 16000044 - 16000019
\end{aligned} \quad (8)$$

$$\text{Max Error} = 25.0 \text{ counts}$$

Therefore, this prior method that increases the time interval 303 for calculating the frequency ratio also does not accurately compute the Computed B value.

Figure 4:
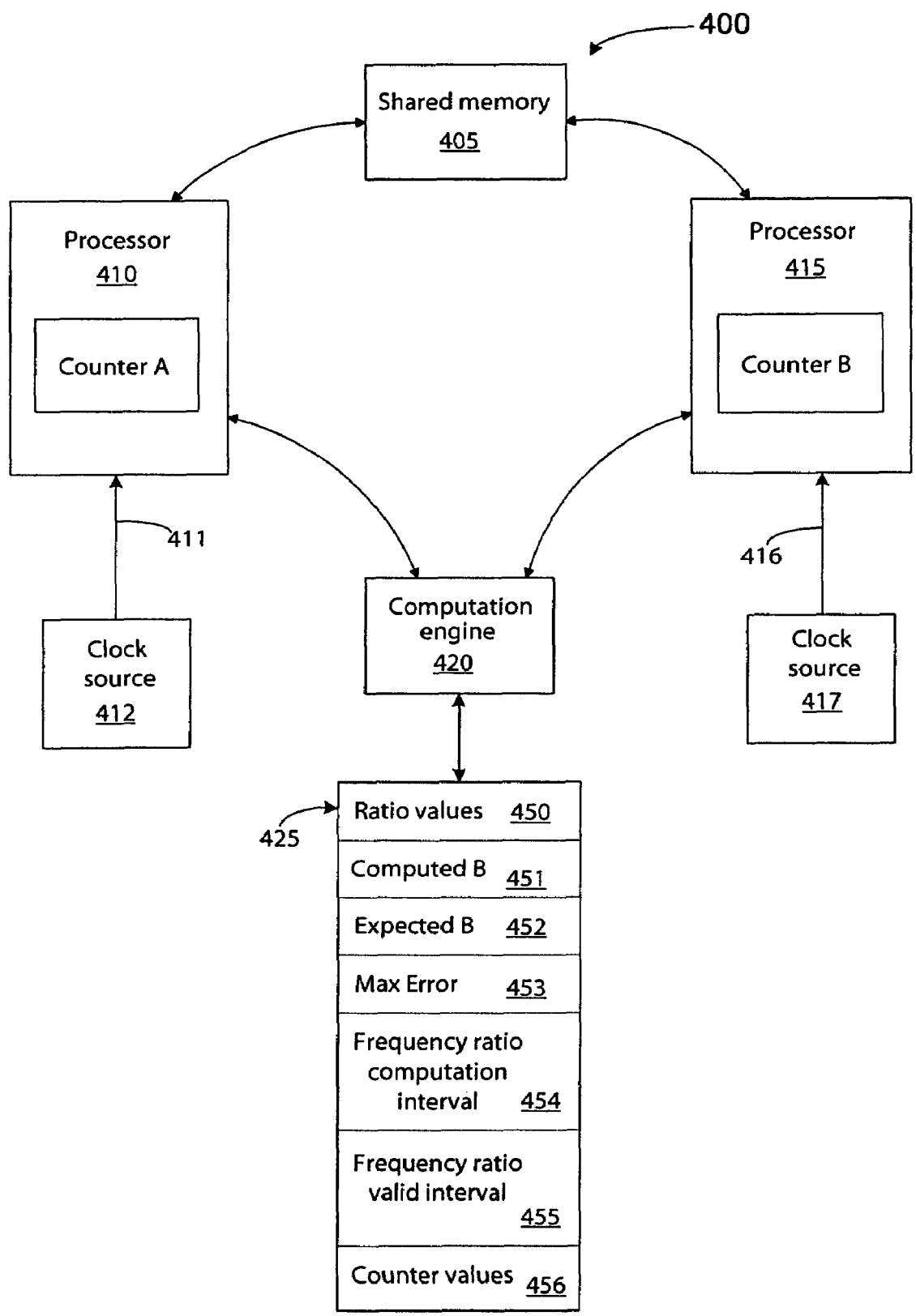
FIG. 4 is a block diagram of an apparatus (system) in accordance with an embodiment of the invention.

FIG. 4 is a block diagram of an apparatus (system) 400, in accordance with an embodiment of the invention. The apparatus 400 includes a shared memory 405 that is accessed by the processors 410 and 415. The processor 410 includes a Counter A that counts the sequence of operations that are performed by the processor 410. The processor 410 also receives clock signals 411 from a clock source 412.

The processor 415 includes a Counter B that counts the sequence of operations that are performed by the processor 415. The processor 415 also receives clock signals 416 from a clock source 417.

A computation engine 420 reads the Counters A and B, performs a calculation of the frequency ratio, the Computed B value, the Expected B value, and the Max Error value, and stores in a buffer 425 various values such as the frequency ratio values 450 for frequency ratio computation intervals 454 (e.g., time intervals 502 and 602 in FIGS. 5 and 6, respectively), computed B values 451 for frequency ratio valid intervals 455 (e.g., time intervals 503 and 603 in FIGS. 5 and 6, respectively), Expected B values 452, and Max Error values 453. The buffer 425 also stores the counter A values and counter B values (values 456) that are read by the computation engine 420. As discussed below, the computation engine 420 performs calculation that advantageously reduces the Max Error value as compared to prior methods.

The buffer 425 is, for example, a circular buffer, FIFO buffer, or other suitable structure that permits a range of values to be stored, calculated, and modified over time, so that the computation engine 420 can perform the calculations discussed below with reference to FIGS. 5 and 6. Therefore, the buffer 425 can store a window of counter values as shown by, for example, the time intervals 502, 503, 602, and 603 in FIG. 5 or 6.

The computation engine 420 includes the hardware and software elements that permit reading of the Counters A and B values, the calculations of the values for the frequency ratio (Ratio), Computed B, Expected B, and Max Error, and the performing of the windowing algorithm that chooses intervals for computing the frequency ratio and the intervals where the frequency ratio is applied as discussed below in FIG. 5.

Figure 5:
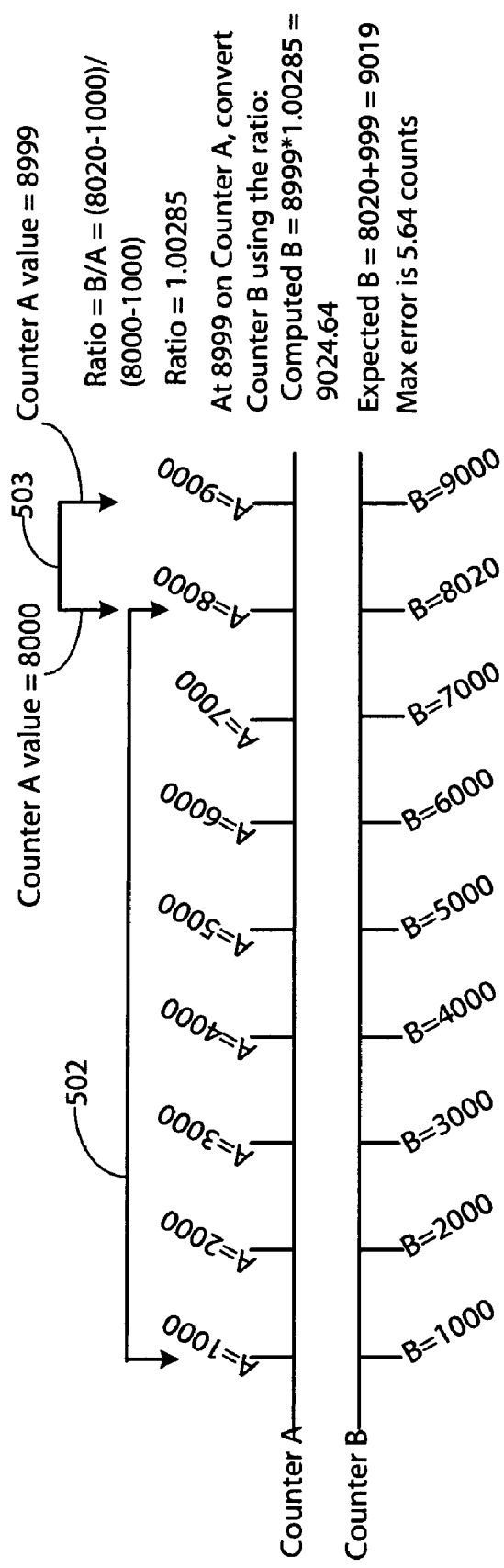
FIG. 5 is a graph illustrating a method of computing the counter values when frequency ratio is used in the computation, in accordance with an embodiment of the invention.

FIG. 5 is a graph illustrating a method for computing counter values when frequency ratio is used in the computation, in accordance with an embodiment of the invention. The computation engine 420 (FIG. 4) will initially use the time interval 502 (i.e., frequency ratio computation interval 502) to compute a first frequency ratio. The time interval 502 can be set in the engine 420 to various suitable values (e.g., approximate 500 milliseconds) and can be adjusted to other values as well. Assume in the example of FIG. 5 that computation engine 420 reads a Counter A value of 1000 at the beginning of time interval 502 and reads a Counter A value of 8000 at the end of time interval 502. This first frequency ratio of Counter A to Counter B is equal to Ratio=1.00285 and is determined based upon equation (9):

$$\begin{aligned}
\text{Ratio} &= (C1.\text{end} - C1.\text{start})/(C2.\text{end} - C2.\text{start}) \\
&= (8020 - 1000)/(8000 - 1000)
\end{aligned} \quad (9)$$

$$\text{Ratio} = 1.00285$$

The variation in the counters due to latencies in accessing the shared memory 405 (FIG. 4) is a factor in the calculation of the frequency ratio as shown in equation (9). In other words, the (C1.end−C1.start) value and/or (C2.end−C2.start) in equation (9) is affected by the variation due to latencies.

The computation engine 425 applies this first frequency ratio value of 1.00285 to a time interval 503 (i.e., frequency ratio valid interval 503). The time interval 503 can be set in the engine 425 to various values (e.g., approximately 10 milliseconds) and can be adjusted to other values as well so that the Max Error value is reduced further. In an embodiment of the invention, the interval 503 occurs after the interval 502, and the interval 503 does not overlap with the interval 502 as shown in FIG. 5. Assume in the example of FIG. 5 that the computation engine 420 reads a Counter A value of 8000 at the beginning of time interval 503 and reads a Counter A value of 8999 at the end of the time interval 503. Therefore, to calculate the Computed B value, the computation engine 425 multiplies this first frequency ratio value of 1.00285 to the Counter A value of 8999 at the end of time interval 503, as shown in equation (10).

$$\text{Computed } B = 8999 \times 1.00285$$

$$\text{Computed B} = 9024.64 \quad (10)$$

The last known value of counter B of 8020 was previously measured by the computation engine 420 at the end of time interval 502. The number of counts that have elapsed on Counter A (from the last known Counter A value of 8000 as measured by the computation engine 420, to the end of the time interval 503 where the frequency ratio is applied) is defined by the time interval 503 also. The time interval 303 in the example of FIG. 5 has 999 counts because Counter A has a value of 8999 at the end of the time interval 503 and 8000 counts at the beginning of the time interval 503. The Expected B value is calculated by use of equation (11):

$$\begin{aligned} \text{Expected } B = &\text{ (last known value of counter } B) + \\ &\text{ (the number of counts that have} \\ &\text{ elapsed on Counter } A \text{ from the last} \\ &\text{ known Counter } A \text{ value to the end of} \\ &\text{ the time interval where the frequency} \\ &\text{ ratio is applied)} \\ = &\ 8020 + 999 \end{aligned} \quad (11)$$

$$\text{Expected } B = 9019$$

As a result, the measured error (i.e., "Max Error") between the computed value of Counter B at the end of time interval 503 where the first frequency ratio is used (Computed B) and the expected value for counter B at the end of the time interval 503 where the frequency ratio is used is advantageously reduced to 5.64 counts, as shown in equation (12).

$$\begin{aligned} \text{Max Error} &= (\text{Computed } B) - (\text{Expected } B) \\ &= 9024.64 - 9019 \end{aligned} \quad (12)$$

$$\text{Max Error} = 5.64 \text{ counts}$$

Therefore, the method in FIG. 5 advantageously reduces the error between Computed B and Expected B as compared to prior methods.

Note that the computation engine 420 can be programmed so that the time intervals 502 and 503 can be set to other values. By varying the values of the time intervals 502 and 503, the Max Error value can potentially be decreased further in equation (12) above. For example, if the computation engine 420 is programmed so that the time interval 503 is decreased, resulting in only 888 counts for Counter A in the reduced time interval 503, then the Max Error value in equation (12) will advantageously decrease to 5.33 counts as compared to the previous value of 5.64 counts.

Figure 6:
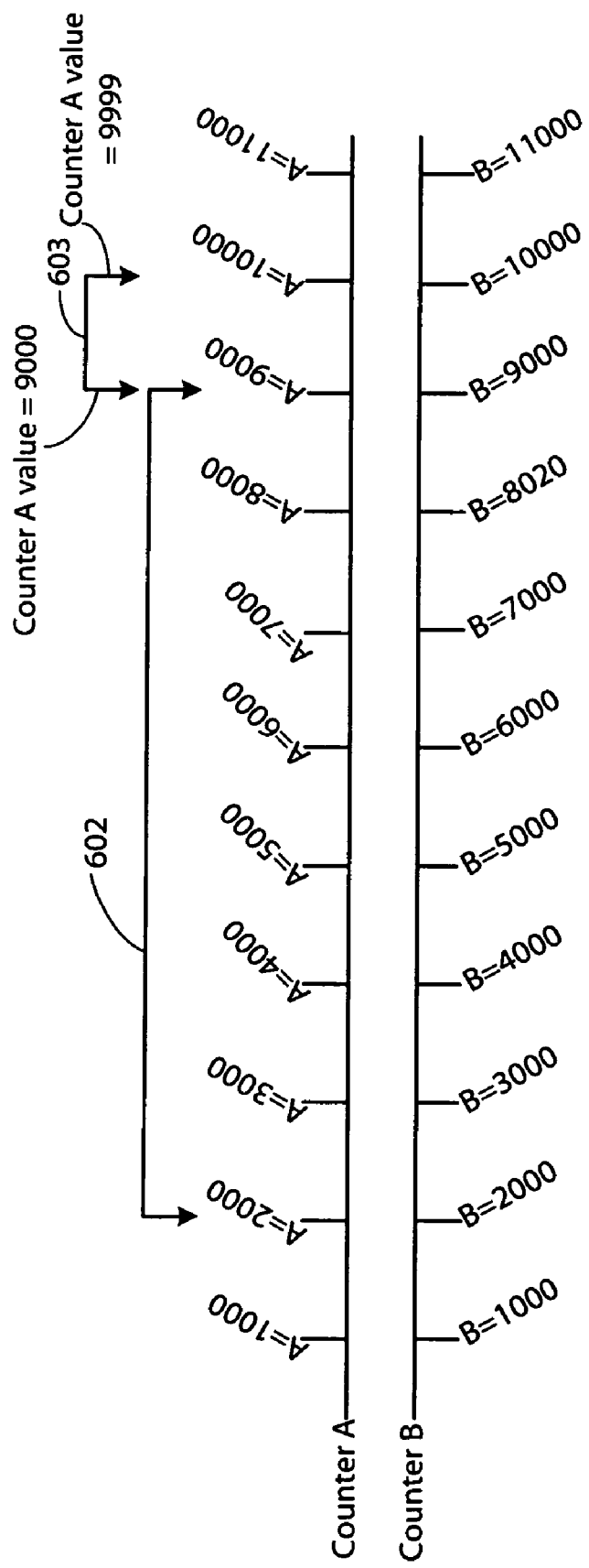
FIG. 6 is graph illustrating additional details of the method of computing the counter values when frequency ratio is used in the computation, in accordance with an embodiment of the invention.

FIG. 6 is graph illustrating additional details of the method for computing counter values when frequency ratio is used in the computation, in accordance with an embodiment of the invention. The computation engine 420 (FIG. 4) will next use the time interval 602 to compute a second or next frequency ratio. This next frequency ratio is then applied at the next time interval 603 which begins at the Counter A value of 9000 and ends at the Counter A value of 9999 in this example of FIG. 6. The time interval 603 is subsequent to the time interval 602, and the time interval 603 does not overlap the time interval 602 as shown in FIG. 6.

The time interval 602 begins with the Counter A value at 2000 and ends with the Counter A value at 9000. This next frequency ratio of Counter A to Counter B is equal to Ratio=1.00285 as determined by equation (13):

$$\begin{aligned} \text{Ratio} &= (C1.\text{end} - C1.\text{start})/(C2.\text{end} - C2.\text{start}) \\ &= (9000 - 2000)/(9000 - 2000) \end{aligned} \quad (13)$$

$$\text{Ratio} = 1.00$$

The computation engine 425 applies this frequency ratio value of 1.00 to time interval 603. This time interval 603 begins with the Counter A value at 9000 and ends with the Counter A value at 9999 in the example of FIG. 6. Therefore, to calculate the Computed B value, the computation engine 425 multiplies this frequency ratio value of 1.00 to the Counter A value of 9999 at the end of time interval 603, as shown in equation (14).

$$\text{Computed } B = 9999 \times 1.00$$

$$\text{Computed B} = 9999 \quad (14)$$

The last known value of counter B of 9000 was previously measured by the computation engine 420 at the end of time interval 602. The number of counts that have elapsed on Counter A (from the last known Counter A value of 9000 as measured by the computation engine 420, to the end of the time interval 603 where the frequency ratio is applied) is defined by the time interval 603 also. The time interval 603 in the example of FIG. 6 has 999 counts because Counter A has a value of 9999 at the end of the time interval 603 and 9000 counts at the beginning of the time interval 603. Expected B is calculated by use of equation (15):

$$\begin{aligned} \text{Expected } B = &\text{ (last known value of counter } B) + \\ &\text{ (the number of counts that have} \\ &\text{ elapsed on Counter } A \text{ from the last} \\ &\text{ known Counter } A \text{ value to the end of} \\ &\text{ the time interval where the frequency} \\ &\text{ ratio is applied)} \\ = &\ 9000 + 999 \end{aligned} \quad (15)$$

$$\text{Expected } B = 9999$$

Therefore, the measured error (i.e., "Max Error") between the computed value of Counter B at the end of time interval 503 where the first frequency ratio is used (Computed B) and the expected value for counter B at the end of the time interval 503 where the frequency ratio is used is 0.0 counts, as shown in equation (16).

$$\begin{aligned} \text{Max Error} &= (\text{Computed } B) - (\text{Expected } B) \\ &= 9999 - 9999 \end{aligned} \quad (16)$$

$$\text{Max Error} = 0.00 \text{ counts}$$

Therefore, the method in FIGS. 5 through 6 advantageously reduces the error between Computed B and Expected B.

Figure 7:
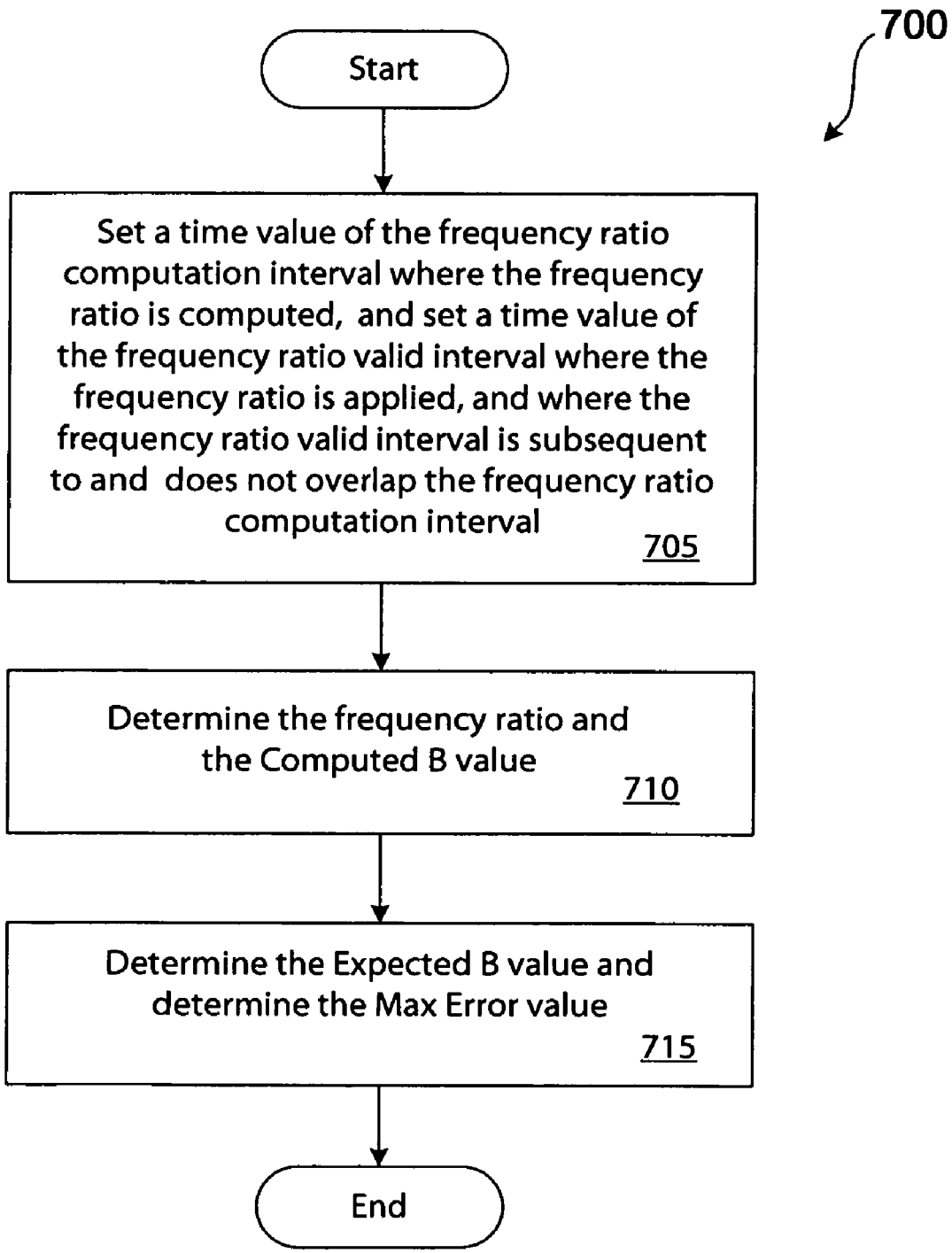
FIG. 7 is a flow diagram of a method in accordance with an embodiment of the invention.

FIG. 7 is a flow diagram of a method 700 in accordance with an embodiment of the invention. In block 705, the time value is set in the computation engine 420 for the frequency ratio computation interval where the frequency ratio is computed (e.g., time value of interval 502 in FIG. 5). In block 705, the time value is also set in the computation engine 420 for the frequency ratio valid interval where the frequency ratio is applied (e.g., time value of interval 503). The frequency ratio valid interval is subsequent to the frequency ratio computation interval and does not overlap the frequency ratio computation interval. As discussed above, the variation in the counters due to latencies in accessing the shared memory 405 (FIG. 4) is a factor in the calculation of the frequency ratio as shown in equation (9). In other words, the (C1.end−C1.start) value and/or (C2.end−C2.start) in equation (9) is affected by the variation due to latencies.

In block 710, the computation engine 420 determines the frequency ratio and the Computed B value. The computation engine 420 determines the values in block 710 by reading the counter values of a first counter and a second counter within the time intervals discussed above and based on the various equations discussed above.

In block 715, the computation engine 420 determines the Expected B value and the Max Error value. The Max Error value is the difference between the Computed B value and the Expected B value as discussed above.

Embodiments of the invention advantageously permit accurate computation of counter values when latencies occur, and these values are useful for time synchronization within a multi-processor system. Embodiments of the invention also advantageously provide a method of determining the frequency ratio and using the frequency ratio to calculate counter values when memory latency occurs in the multi-processor system. Additionally, embodiments of the invention advantageously do not require significant additional hardware and software overhead in order to perform the methods discussed above. In addition, embodiments of the invention advantageously permit various time intervals to be adjusted or fine-tuned so that the Max Error value can be further reduced as discussed above. As an additional advantage, embodiments of the invention avoids the complex floating points calculation of the Network Time Protocol (RFC-1305) which is designed for the different environment of synchronizing time in long latency networks such as the Internet.

It is also within the scope of the present invention to implement a program or code that can be stored in a machine-readable or computer-readable medium to permit a computer to perform any of the inventive techniques described above, or a program or code that can be stored in an article of manufacture that includes a computer readable medium on which computer-readable instructions for carrying out embodiments of the inventive techniques are stored. Other variations and modifications of the above-described embodiments and methods are possible in light of the teaching discussed herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for use in a multi-processor system, the method comprising:

setting, in a buffer accessible by a computation engine, a first value defining a frequency ratio computation interval and a second value defining a frequency ratio valid interval;

determining, by the computation engine, a processor clock frequency ratio by reading counter values of a first counter corresponding to a first processor and of a second counter corresponding to a second processor within the frequency ratio computation interval; and calculating, by the computation engine, a value of the second counter at an end of the frequency ratio valid interval based on application of the frequency ratio, wherein the frequency ratio valid interval is subsequent to the frequency ratio computation interval, and wherein the frequency ratio valid interval does not overlap the frequency ratio computation interval.

2. The method of claim 1, wherein a variation in the counters due to latencies in accessing a shared memory are factors in a calculation of the frequency ratio.

3. The method of claim 1, wherein calculating the value of the second counter at the end of the frequency ratio valid interval comprises:

multiplying the frequency ratio with a value of the first counter at the end of the frequency ratio valid interval.

4. The method of claim 1, further comprising:

determining an expected value for the second counter at the end of the frequency ratio valid interval; and determining a difference between the calculated value of the second counter at the end of the frequency ratio valid interval and the expected value for the second counter at the end of the frequency ratio valid interval.

5. The method of claim 4, wherein determining the expected value for the second counter at the end of the frequency ratio valid interval comprises adding a value of the second counter at the end of the frequency ratio computation interval with a value of counts that have elapsed on the first counter during the frequency ratio valid interval.

6. The method of claim 4, further comprising:

adjusting at least one of the first value defining the frequency ratio computation interval and the second value defining the frequency ratio valid interval, in order to reduce a difference between the calculated value of the second counter at the end of the frequency ratio valid interval and the expected value for the second counter at the end of the frequency ratio valid interval.

7. The method of claim 1, further comprising:

programming different values for the frequency ratio computation interval and the frequency ratio valid interval into the buffer to vary the frequency ratio computation interval and the frequency ratio valid interval to achieve different performance in the multi-processor system.

8. The method of claim 1, wherein the processor clock frequency ratio is a first processor clock frequency ratio, wherein determining the first processor clock frequency ratio is performed using the counter values in the frequency ratio computation interval that starts at a first time point and ends at a second time point, the method further comprising:

computing a second processor clock frequency ratio by reading counter values of the first counter and the second counter within the frequency ratio computation interval that starts at a third time point after the first time point but before the second time point.

9. The method of claim 8, wherein the frequency ratio valid interval for calculation of the value of the second counter is between a first range of time points, the method further comprising:

calculating a second value of the second counter at an end of the frequency ratio valid interval that is between a second range of time points different from the first range, wherein the second value of the second counter is determined by applying the second processor clock frequency ratio to a value of the first counter at the end of the frequency ratio valid interval that is between the second range of time points, wherein the frequency ratio valid interval between the second range of time points is subsequent to and does not overlap the frequency ratio computation interval that starts at the third time point.

10. An apparatus for use in a multi-processor system, the apparatus comprising:

a computation engine configured to determine a processor clock frequency ratio by reading counter values of a first counter and of a second counter within a frequency ratio computation interval, and configured to calculate a value of the second counter at an end of a frequency ratio valid interval where the frequency ratio is applied, wherein the frequency ratio valid interval is subsequent to the frequency ratio computation interval, and wherein the frequency ratio valid interval does not overlap the frequency ratio computation interval; and a buffer accessible by the computation engine and configured to store a first value defining the frequency ratio computation interval and a second value defining the frequency ratio valid interval.

11. The apparatus of claim 10, wherein the buffer is configured to further store values calculated by the computation engine and values measured by the computation engine.

12. The apparatus of claim 10, wherein a variation in the counters due to latencies in accessing a shared memory are factors in a calculation of the frequency ratio.

13. The apparatus of claim 10, wherein the computation engine is configured to calculate the value of the second counter at the end of the frequency ratio valid interval by multiplying the frequency ratio with a value of the first counter at the end of the frequency ratio valid interval.

14. The apparatus of claim 10, wherein the computation engine is configured to determine an expected value for the second counter at the end of the frequency ratio valid interval, and configured to determine a difference between the calculated value of the second counter at the end of the frequency ratio valid interval and the expected value for the second counter at the end of the frequency ratio valid interval.

15. The apparatus of claim 14, wherein the computation engine is configured to determine the expected value for the second counter at the end of the frequency ratio valid interval by adding a value of the second counter at the end of the frequency ratio computation interval with a value of counts that have elapsed on the first counter during the frequency ratio valid interval.

16. The apparatus of claim 10, wherein the computation engine is configured to adjust at least one of the first value defining the frequency ratio computation interval and the second value defining the frequency ratio valid interval, in order to reduce a difference between the calculated value of the second counter at the end of the frequency ratio valid interval and the expected value for the second counter at the end of the frequency ratio valid interval.

17. The apparatus of claim 10, wherein the first counter corresponds to a first processor and the second counter corresponds to a second processor.

18. The apparatus of claim 10, wherein the buffer is programmable to different values for the frequency ratio computation interval and the frequency ratio valid interval to vary the frequency ratio computation interval and the frequency ratio valid internal to achieve different performance in the multi-processor system.

19. The apparatus of claim 10, wherein the processor clock frequency ratio is a first processor clock frequency ratio, wherein the first processor clock frequency ratio is determined using the counter values in the frequency ratio computation interval that starts at a first time point and ends at a second time point, and wherein the computation engine is configured to further:

compute a second processor clock frequency ratio by reading counter values of the first counter and the second counter within the frequency ratio computation interval that starts at a third time point after the first time point but before the second time point, wherein the frequency ratio computational interval that starts at the third time point is shifted with but overlaps the frequency ratio computation interval that starts at the first time point.

20. The apparatus of claim 19, wherein the frequency ratio valid interval for calculation of the value of the second counter is between a first range of time points, wherein the computation engine is configured to further:

calculate a second value of the second counter at an end of the frequency ratio valid interval that is between a second range of time points different from the first range, wherein the second value of the second counter is determined by applying the second processor clock frequency ratio to a value of the first counter at the end of the frequency ratio valid interval that is between the second range of time points, wherein the frequency ratio valid interval between the second range of time points is subsequent to and does not overlap the frequency ratio computation interval that starts at the third time point.

21. An apparatus for use in a multi-processor system, the apparatus comprising:

a buffer to store a first value defining a frequency ratio computation interval and a second value defining a frequency ratio valid interval;

means for determining a processor clock frequency ratio by reading counter values of a first counter corresponding to a first processor and of a second counter corresponding to a second processor within the frequency ratio computation interval; and means for determining a value of the second counter at an end of the frequency ratio valid interval where the frequency ratio is applied, wherein the frequency ratio valid interval is subsequent to the frequency ratio computation interval, and wherein the frequency ratio valid interval does not overlap the frequency ratio computation interval.

22. An article of manufacture comprising:

a machine-readable medium having stored thereon instructions that upon execution cause a computer to:

set, in a buffer accessible by a computation engine, a first value defining a frequency ratio computation interval and a second value defining a frequency ratio valid interval;

determine a processor clock frequency ratio by reading counter values of a first counter and of a second counter within the frequency ratio computation interval; and calculate a value of the second counter at an end of the frequency ratio valid interval where the frequency ratio is applied, wherein the frequency ratio valid interval is subsequent to the frequency ratio computation interval, and wherein the frequency ratio valid interval does not overlap the frequency ratio computation interval.

23. The article of claim 22, wherein the instructions upon execution cause the computer to further:

program different values for the frequency ratio computation interval and the frequency ratio valid interval into the buffer to vary the frequency ratio computation interval and the frequency ratio valid interval to achieve different performance in the computer.

24. The article of claim 23, wherein the instructions upon execution cause the computer to further:

determine an expected value for the second counter at the end of the frequency ratio valid interval; and determine a difference between the calculated value of the second counter at the end of the frequency ratio valid interval and the expected value of the second counter at the end of the frequency ratio valid interval, wherein programming different values for the frequency ratio computation interval and the frequency ratio valid interval varies a difference between the calculated value of the second counter at the end of the frequency ratio valid interval and the expected value for the second counter at the end of the frequency ratio valid interval.

\* \* \* \* \*

UNITED STATES PATENT AND TRADEMARK OFFICE
CERTIFICATE OF CORRECTION

| | | |
|---|---|---|
| PATENT NO. | : 7,673,166 B2 | Page 1 of 1 |
| APPLICATION NO. | : 11/586284 | |
| DATED | : March 2, 2010 | |
| INVENTOR(S) | : Jonathan Yu Han Liu et al. | |

It is certified that error appears in the above-identified patent and that said Letters Patent is hereby corrected as shown below:

In column 12, line 17, in Claim 19, delete "computational" and insert -- computation --, therefor.

Signed and Sealed this

Twenty-seventh Day of July, 2010

David J. Kappos
*Director of the United States Patent and Trademark Office*